United States Patent
Baek et al.

(10) Patent No.: US 9,123,951 B2
(45) Date of Patent: Sep. 1, 2015

(54) SECONDARY BATTERY PACK HAVING EXCELLENT ENERGY DENSITY AND PCM ASSEMBLY THEREFOR

(75) Inventors: Ju-Hwan Baek, Chungcheongbuk-do (KR); Ki eob Moon, Seoul (KR); Soonkwang Jung, Seoul (KR); Sukjin Song, Yongin-si (KR)

(73) Assignee: LG Chem, Ltd., Seoul (KR)

( * ) Notice: Subject to any disclaimer, the term of this patent is extended or adjusted under 35 U.S.C. 154(b) by 1059 days.

(21) Appl. No.: 12/738,512

(22) PCT Filed: Oct. 14, 2008

(86) PCT No.: PCT/KR2008/006050
§ 371 (c)(1),
(2), (4) Date: Sep. 16, 2010

(87) PCT Pub. No.: WO2009/051388
PCT Pub. Date: Apr. 23, 2009

(65) Prior Publication Data
US 2011/0020672 A1    Jan. 27, 2011

(30) Foreign Application Priority Data

Oct. 18, 2007  (KR) .................. 10-2007-0105189

(51) Int. Cl.
*H01M 2/34* (2006.01)
*H01M 2/20* (2006.01)
(Continued)

(52) U.S. Cl.
CPC ...... *H01M 2/34* (2013.01); *H01M 2/06* (2013.01); *H01M 10/425* (2013.01)

(58) Field of Classification Search
USPC .............................................. 429/7, 175–179
See application file for complete search history.

(56) References Cited

U.S. PATENT DOCUMENTS

2002/0142195 A1*  10/2002  Ehara ............................. 429/7
2003/0003357 A1*   1/2003  Tamai et al. ................. 429/181
(Continued)

FOREIGN PATENT DOCUMENTS

JP         2003-17020 A      1/2003
KR   10-2005-0080513 A      8/2005
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP

(57) ABSTRACT

Disclosed herein is a secondary battery pack including a battery cell, and a protection circuit module (PCM) assembly, configured in a specific structure, coupled to the top of the battery cell. The secondary battery pack includes a battery cell having an electrode assembly mounted in a battery case together with an electrolyte in a sealed state, a protection circuit module (PCM) assembly including a PCM and connection members, the PCM assembly being provided with a through-hole for connection, an insulative mounting member mounted at the top of the battery cell, an insulative cap coupled to an upper end of the battery cell. One of the connection members, i.e., the connection member (A), protrudes from one end of the PCM assembly such that a region of the connection member (A) electrically connected to the battery cell is exposed upward from the PCM assembly. The other connection member, i.e., the connection member (B), is coupled to the bottom of the PCM such that at least a portion of the connection member (B) is exposed upward from the PCM assembly through the through-hole for connection. The electrical connection between the connection members and the electrode terminals of the battery cell is achieved at the top of the PCM while the insulative mounting member and the PCM assembly are loaded on the battery cell.

17 Claims, 3 Drawing Sheets

(51) Int. Cl.
*H01M 10/42* (2006.01)
*H01M 2/06* (2006.01)

(56) References Cited

U.S. PATENT DOCUMENTS

| | | | |
|---|---|---|---|
| 2003/0077486 A1* | 4/2003 | Iwaizono et al. | 429/7 |
| 2004/0251872 A1* | 12/2004 | Wang et al. | 320/112 |
| 2005/0208345 A1* | 9/2005 | Yoon et al. | 429/7 |
| 2005/0208346 A1* | 9/2005 | Moon et al. | 429/7 |
| 2006/0093896 A1* | 5/2006 | Hong et al. | 429/61 |
| 2007/0026302 A1* | 2/2007 | Yoon | 429/129 |
| 2008/0233472 A1* | 9/2008 | Ota et al. | 429/122 |
| 2009/0068501 A1* | 3/2009 | Hong et al. | 429/7 |

FOREIGN PATENT DOCUMENTS

| | | |
|---|---|---|
| KR | 10-2005-0080514 A | 8/2005 |
| KR | 10-0685605 A | 2/2007 |
| WO | WO2008/066222 A1 | 6/2008 |

\* cited by examiner

SECONDARY BATTERY PACK HAVING EXCELLENT ENERGY DENSITY AND PCM ASSEMBLY THEREFOR

FIELD OF THE INVENTION

The present invention relates to a secondary battery pack having excellent energy density, and, more particularly, to a secondary battery pack including a battery cell, a protection circuit module (PCM) assembly including a PCM and connection members, an insulative mounting member mounted at the top of the battery cell, an insulative cap coupled to the upper end of the battery cell, wherein one of the connection members, i.e., the connection member (A), protrudes from one end of the PCM assembly such that a region of the connection member (A) electrically connected to the battery cell is exposed upward from the PCM assembly, the other connection member, i.e., the connection member (B), is coupled to the bottom of the PCM such that at least a portion of the connection member (B) is exposed upward from the PCM assembly through a through-hole for connection, and the electrical connection between the connection members and the electrode terminals of the battery cell is achieved at the top of the PCM while the insulative mounting member and the PCM assembly are loaded on the battery cell.

BACKGROUND OF THE INVENTION

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as the mobile devices.

On the other hand, various kinds of combustible materials are contained in the lithium secondary battery. As a result, the lithium secondary battery may be heated or explode due to the overcharge of the battery, the overcurrent in the battery, or other physical external impacts. That is, the safety of the lithium secondary battery is very low. Consequently, a protection circuit module (PCM) for effectively controlling an abnormal state of the battery, such as the overcharge of the battery, is loaded on a battery cell while being connected to the battery cell.

Generally, the PCM is connected to the battery cell via conductive nickel plates by welding or soldering. That is, the nickel plates are connected to electrode tabs of the PCM by welding or soldering, and then the nickel plates are connected to corresponding electrode terminals of the battery cell by welding or soldering. In this way, the PCM is connected to the battery cell to manufacture a battery pack.

It is required for safety elements, including the PCM, to be maintained in electrical connection with the electrode terminals of the battery cell and, at the same time, to be electrically isolated from other parts of the battery cell. Consequently, a plurality of insulative mounting members or a plurality of parts are required to construct such connection, with the result that the battery pack assembly process is complicated, and a space for receiving the battery cell decreases.

Also, a large number of welding or soldering processes are required to construct the battery pack, and the welding or soldering processes must be carried out with high precision because of the small structure of the secondary battery. As a result, a defect possibility is great. Furthermore, the welding or soldering processes are added during the manufacturing process of a product, which increases the manufacturing costs.

Consequently, research has been actively made on a technology for reducing the number of parts loaded on the top of the battery cell and increasing the capacity of the battery cell. For example, Korean Patent Application Publication No. 2004-0021308 discloses a closed type secondary battery including an electrode assembly having anode plates, cathode plates, and separators for insulating the anode plates and the cathode plates from each other, respectively, a container for receiving the electrode assembly, the container having an opening formed at one surface thereof, a first round surface provided at one side thereof, and a first flat surface provided at the other side thereof opposite to the first round surface, and a cap assembly for electrically connecting at least one electrode plate, among the anode plates and the cathode plates, to the outside, the cap assembly having a cap plate for sealing the opening of the container, wherein a safety element is attached to the first flat surface.

The above-described technology has an advantage in that the safety element is attached to the outer surface of the battery container, i.e., the first flat surface of the battery container, whereby it is possible to easily attach the safety element to the secondary battery. However, the disclosed technology has a problem in that the total volume of a battery pack, in which the secondary battery is mounted, increases.

Consequently, there is a high necessity for a technology that is capable of reducing the number of members mounted to the top of the battery cell to simplify the assembly process, reducing the number of welding processes to decrease a defect rate, achieving stable coupling between the members loaded on the top of the battery cell, and increasing the capacity of the battery cell.

SUMMARY OF THE INVENTION

Therefore, the present invention has been made to solve the above-mentioned problems, and other technical problems that have yet to be resolved.

Specifically, it is an object of the present invention to provide a secondary battery pack wherein the number of parts necessary to construct the battery pack is reduced and a process of assembling the battery pack is simplified, to reduce the battery manufacturing costs, the battery pack has a stable coupling structure to minimize defect and internal resistance change due to external impact, and the capacity of the battery pack is increased.

In accordance with one aspect of the present invention, the above and other objects can be accomplished by the provision of a secondary battery pack including a battery cell having an electrode assembly of a cathode/separator/anode structure mounted in a battery case together with an electrolyte in a sealed state, a protection circuit module (PCM) assembly including a PCM and connection members coupled to a bottom of the PCM, the PCM assembly being provided with a through-hole for connection, an insulative mounting member constructed in a structure in which the PCM assembly is loaded on the top of the insulative mounting member, the insulative mounting member being mounted at the top of the battery cell, the insulative mounting member having openings through which electrode terminals of the battery cells are exposed, an insulative cap coupled to an upper end of the battery cell for covering the insulative mounting member in a state in which the PCM assembly is loaded on the insulative mounting member, wherein one of the connection members, i.e., the connection member (A), protrudes from one end of the PCM assembly such that a region of the connection member (A) electrically connected to the battery cell is exposed upward from the PCM assembly, the other connection member, i.e., the connection member (B), is coupled to the bottom of the PCM such that at least a portion of the connection member (B) is exposed upward from the PCM assembly through the through-hole for connection, and the electrical connection between the connection members and the electrode terminals of the battery cell is achieved at a top of the PCM while the insulative mounting member and the PCM assembly are loaded on the battery cell.

That is, the secondary battery pack according to the present invention is constituted by the battery cell, the PCM assembly, the insulative mounting member, and the insulative cap. The coupling of the PCM assembly (preferably, the insulative mounting member and the PCM assembly) to the battery cell is achieved by the electrical connection between the connection members, coupled to the bottom of the PCM assembly, and the electrode terminals of the battery cell. Consequently, the assembly of the secondary battery pack is achieved in a simple connection fashion.

Also, the connection members are integrally coupled to the bottom of the PCM, and the respective connection members are exposed upward from the PCM assembly. Consequently, the number of parts constituting the secondary battery pack is reduced, and the easiness of the assembly process is improved, whereby the productivity is greatly improved.

Furthermore, the connection members are welded to the battery cell in a state in which the PCM is loaded on the battery cell (specifically, the insulative mounting member). Consequently, it is possible to greatly reduce a space (a space necessary to bend the connection member at the time of mounting the PCM) required in a conventional battery pack assembly process in which the relatively long connection member is connected to the battery cell, and then the PCM is mounted on the battery cell, and therefore, to manufacture a battery pack having energy density higher than other battery packs having the same standard.

It is required for the battery case to exhibit easy processability and a mechanical strength of a predetermined level or more. For example, the battery case may be a metal container. Preferably, the battery case is an aluminum container or a stainless steel container.

The coupling between the connection members and the PCM may be achieved in various methods. For example, the connection members may be coupled to the bottom of the PCM by a surface mount technology (SMT). In case of soldering, paste is left at the bottom of the PCM. In case of welding, the bottom of the PCM is damaged by heat. However, the SMT prevents the paste from being left at the bottom of the PCM and the bottom of the PCM from being damaged by heat. In addition, the SMT achieves the coupling between the connection members and the PCM more accurately and reliably than the conventional welding or soldering method. Consequently, the use of the SMT is preferable. For reference, the SMT is mainly used to mount surface mount parts on an electronic board, such as a printed circuit board (PCB).

In an exemplary embodiment, the connection member (A) is electrically connected to the first electrode terminal of the battery cell, and the connection member (B) is electrically connected to the second electrode terminal of the battery cell.

For example, a prismatic battery cell is constructed in a structure in which an electrode terminal protruding from the top of the battery cell and a battery case form an anode terminal and a cathode terminal, respectively, and an insulation member is disposed between the electrode terminal and the battery case for securing the insulation between the electrode terminal and the battery case. In the prismatic battery cell, therefore, the first electrode terminal is the top of the battery case, serving as the cathode terminal, and the second electrode terminal is the anode terminal protruding from the top of the battery case.

Preferably, the connection member (A) includes a PCM coupling part coupled to the bottom of the PCM, a battery cell coupling part coupled to the top of the battery cell, and a positive temperature coefficient (PTC) element disposed between the PCM coupling part and the battery cell coupling part. The connection member (A), which is coupled to the PTC element, interrupts current flowing to the upper assembly of the battery pack, when the temperature of the battery pack abruptly increases due to an internal short circuit or the like, thereby improving the safety of the battery pack.

In the above-described structure, the material for the PCM coupling part and the battery cell coupling part is not particularly restricted so long as the PCM coupling part and the battery cell coupling part are made of a conductive material. Preferably, the PCM coupling part and the battery cell coupling part are formed of a metal plate, such as a nickel plate.

The material for the connection member (B) is not particularly restricted so long as the connection member (B) is made of a conductive material. Preferably, the connection member (B) is formed of a nickel plate.

In an exemplary embodiment, the insulative mounting member has a size less than the top of the battery cell in the longitudinal direction of the battery cell such that the insulative mounting member is provided with a region where the connection member (A) is connected to the battery cell, and the insulative mounting member is provided with a first opening through which the second electrode terminal of the battery cell is exposed upward and a second opening formed at a position spaced a predetermined distance from the first opening such that an upper-end case protrusion of the battery cell (a sealed electrolyte injection port) is exposed upward through the second opening.

Since the insulative mounting member has a size less than the top of the battery cell in the longitudinal direction of the battery cell, it is possible to secure a space where the connection member (A) is located between one end of the PCM assembly and the one end of the top of the battery cell.

Preferably, the first opening has a shape and size corresponding to the second electrode terminal such that the second electrode terminal protrudes upward through the first opening. Consequently, it is possible to minimize an installation space necessary to mount the insulative mounting member. As a result, the size of the battery cell in the battery pack having the same standard is maximized, and therefore, the increase in capacity of the battery cell is achieved.

Similarly, when the sealed electrolyte injection port is configured to protrude in the shape of a circle, the second opening may be formed in the plan shape of a circle corresponding to the sealed electrolyte injection port.

In another exemplary embodiment, the insulative mounting member is provided at one end thereof in the longitudinal direction with a protrusion extending upward by a predetermined height, the protrusion has a coupling groove formed in a middle part thereof, and the insulative cap has a protruding coupling member corresponding to the coupling groove, thereby increasing a coupling strength between the insulative mounting member and the insulative cap. Consequently, it is possible to easily achieve the coupling between the insulative mounting member and the insulative cap in a mechanical coupling fashion.

Meanwhile, the PCM assembly is mounted at the top of the insulative mounting member. To this end, the insulative mounting member may be provided at opposite ends thereof in the lateral direction with receiving sidewalls protruding upward such that the PCM assembly is stably mounted to the insulative mounting member by the receiving sidewalls.

Specifically, the upper ends of the sidewalls may be coupled to the PCM assembly while supporting the PCM assembly. This structure provides a predetermined space between the PCM assembly and the insulative mounting member, thereby securing a contact space between the second electrode terminal protruding from the battery cell and the corresponding connection member coupled to the bottom of the PCM assembly.

Although the coupling of the insulative mounting member to the top of the battery case is automatically achieved when the connection members of the PCM assembly, loaded on the insulative mounting member, are connected to the battery cell, the coupling between the top of the battery case and the insulative mounting member may be achieved, for example, by bonding, to secure the easiness of the battery pack assembling process and more stable coupling.

The insulative cap serves to protect the battery cell from external impact, increase the mechanical strength of the members mounted at the top of the battery cell, and maintain electrical insulation. Preferably, the insulative cap extends downward by a predetermined length such that at least a portion of the insulative cap covers the outside surface of the upper end of the battery cell in a state in which the insulative cap is coupled to the upper end of the battery cell, thereby improving the coupling to the battery cell. In order to maximize such an effect, the downward extension of the insulative cap is preferably joined to the outer surface of the upper end of the battery cell by bonding or by mechanical coupling.

In addition to the insulative cap coupled to the upper end of the battery cell, an additional insulative cap (a bottom cap) may be also mounted to the lower end of the battery cell. Also, a sheathing film may be attached to the outer surface of the battery case of the battery cell. Consequently, the battery cell is protected from external impact, and the electrical insulation of the battery cell is maintained, by the provision of the sheathing film. Preferably, the sheathing film is attached to the outer surface of the battery case such that the sheathing film covers the lower extension of the insulative cap.

The secondary battery pack according to the present invention may be applicable in various manners irrespective of the kind and appearance of the battery cell. Preferably, the present invention is applicable to a battery pack including a prismatic lithium secondary battery as a battery cell.

In accordance with another aspect of the present invention, there is provided a PCM assembly mounted to a battery cell, including a PCM and connection members coupled to a bottom of the PCM by an SMT, the PCM assembly being provided at a middle part thereof with a through-hole for welding; wherein one of the connection members, i.e., the connection member (A), is coupled to the PCM while the connection member (A) protrudes from one end of the PCM assembly such that a region of the connection member (A) electrically welded to the battery cell is exposed upward from the PCM assembly, and the other connection member, i.e., the connection member (B), is coupled to the bottom of the PCM such that at least a portion of the connection member (B) is exposed upward from the PCM assembly through the through-hole for welding.

Generally, the PCM is a separate member, which is mounted on the top of the battery cell while being electrically connected to the top of the battery cell. Consequently, complicated and troublesome processes for coupling the PCM to the battery cell, such as a large number of welding or soldering processes, are required to mount the PCM to the outside of the battery cell, with the result that a defect rate increases, and, in addition, a space necessary to mount the PCM to the top of the battery cell is required.

In the PCM assembly according to the present invention, on the other hand, the connection members are coupled to the bottom of the PCM by an SMT. Consequently, a defect rate at the connection region is greatly reduced as compared with the conventional welding or soldering method.

Also, since the connection members are exposed upward from the PCM assembly, it is possible to connect the connection members to the corresponding electrode terminals of the battery cell by welding in a state in which the PCM assembly is loaded on the battery cell, thereby simplifying the process of manufacturing the battery pack. Furthermore, it is possible to minimize the size of the connection members and the size of the PCM assembly mounted to the battery cell, thereby increasing the capacity of the battery pack as compared with other battery packs having the same standard.

The connection member (A) may include metal plates for connection, attached to the top and bottom of a PTC element. The top plate may be coupled to the PCM, and the bottom plate may extend from one end of the PCM assembly in a protruding fashion such that the bottom plate is welded to the battery cell.

In the structure in which the bottom plate extends from one end of the PCM assembly, the extension region of the bottom plate is coupled to the top of the battery cell by wielding, thereby easily achieving the electrical connection and mechanical coupling between the PCM assembly and the battery cell.

Preferably, the connection member (B) is coupled to the bottom of the PCM assembly such that the connection member (B) completely closes the through-hole for welding. For example, the connection member (B) may be configured in a rectangular structure having a size greater than that of the through-hole for welding such that the connection member (B) completely closes the through-hole for welding.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
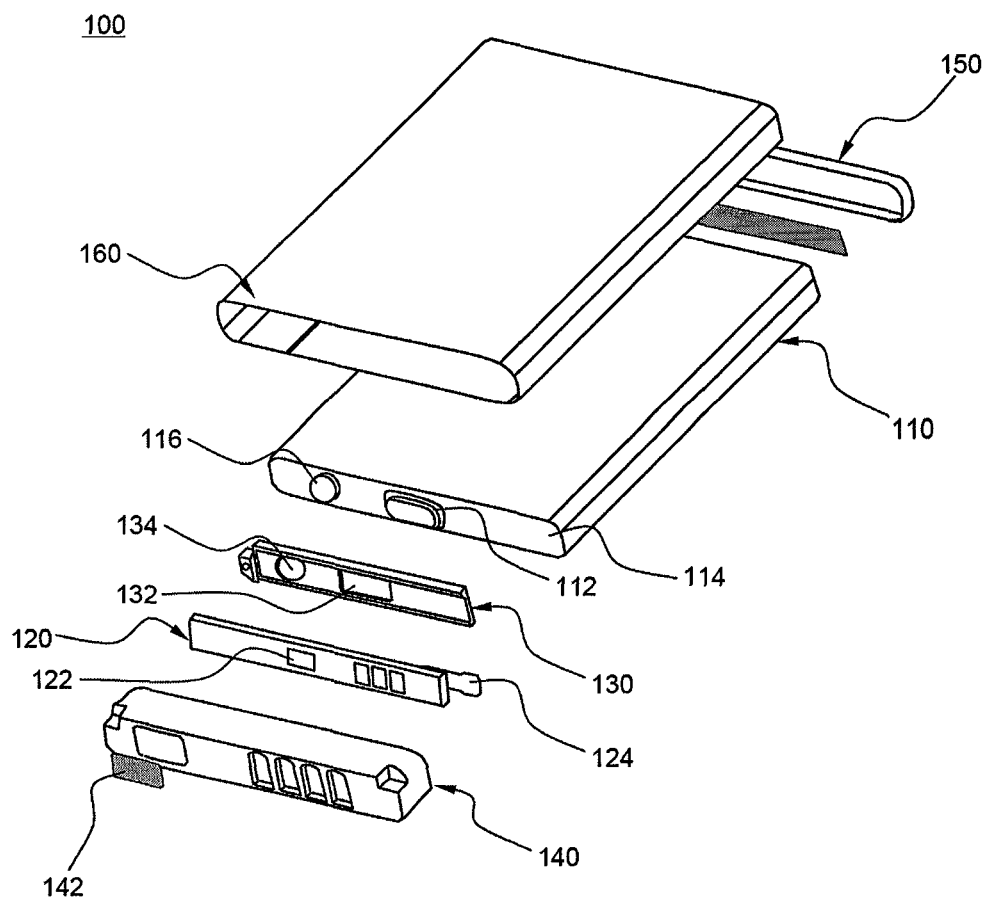
FIG. 1 is an exploded perspective view illustrating a secondary battery pack according to an exemplary embodiment of the present invention.

FIG. 1 is an exploded perspective view illustrating a secondary battery pack according to an exemplary embodiment of the present invention.

Referring to FIG. 1, the secondary battery pack 100 includes a battery cell 110 having an electrode assembly received in a battery case together with an electrolyte in a sealed state, a protection circuit module (PCM) assembly 120 for effectively controlling an abnormal state, such as overcharge, of the battery cell 110, an insulative mounting member 130 mounted at the top 114 of the battery cell 110, the PCM assembly 120 being loaded on the insulative mounting member 130, an insulative top cap 140 coupled to the upper end of the battery cell 110 for covering the insulative mounting member 130 in a state in which the PCM assembly 120 is loaded on the insulative mounting member 130, an insulative bottom cap 150 coupled to the lower end of the battery cell 110, and a sheathing film 160 attached to the outer surface of the battery case of the battery cell 110 for covering the battery case of the battery cell 110.

At the top 114 of the battery cell 110 is formed an anode terminal 112 which protrudes upward while being isolated from the battery case of the battery cell 110. The remaining region of the top 114 of the battery cell 110, excluding the anode terminal 112, serves as a cathode terminal. At one side of the top of the battery cell 110 is formed an electrolyte injection port 116 which protrudes in the plan shape of a circle. The electrolyte injection port 116 is sealed by a metal ball or a polymer resin.

The insulative mounting member 130 is loaded on the top 114 of the battery cell 110 and is joined to the top 114 of the battery cell 110 in a bonding fashion. In the central region of the insulative mounting member 130 is formed a first opening 132, through which the protruding anode terminal 112 of the battery cell 110 is exposed upward. In a one-side region of the insulative mounting member 130 is formed a second opening 134, through which the sealed electrolyte injection port 116 is exposed upward.

A connection member 124 is coupled to the bottom of the PCM assembly 120. A through-hole 122 for welding is formed in the central region of the PCM assembly 120.

The insulative top cap 140 is coupled to the upper end of the battery cell 110 for covering the insulative mounting member 130 in a state in which the PCM assembly 120 is loaded on the insulative mounting member 130. The insulative top cap 140 extends downward by a predetermined length to cover the outside surface of the upper end of the battery cell 110. An after-sales service (A/S) label 142 is attached to one side of the top of the insulative top cap 140.

The sheathing film 160 is attached to the outer surface of the battery case of the battery cell 110 for securing the electrically insulation of the battery cell 110 from the outside and indicating the information of a product. The sheathing film 160 is made of a heat shrinkable material. The sheathing film 160 is manufactured in the shape of a tube. When heat is applied to the sheathing film 160 after the battery cell 110 is covered by the sheathing film 160, the sheathing film 160 shrinks, with the result that the sheathing film 160 comes into tight contact with the outer surface of the battery case of the battery cell 110.

Figure 2:
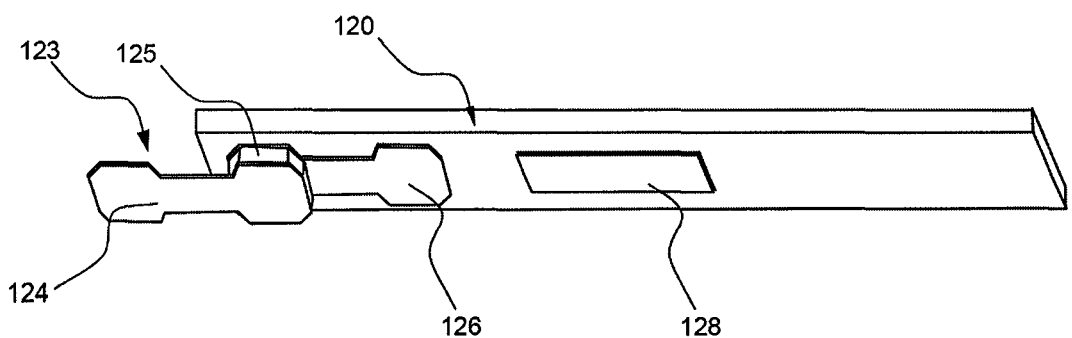
FIG. 2 is a typical view illustrating a structure in which connection members are coupled to the bottom of a protection circuit module (PCM) assembly.

FIG. 2 is a typical view illustrating a structure in which connection members are coupled to the bottom of the PCM assembly.

Referring to FIG. 2 together with FIG. 1, a pair of connection members 123 and 128 are coupled to the bottom of the PCM assembly 120 by a surface mount technology (SMT). The connection member (A) 123, electrically connected to the top 114 of the battery cell 110, includes a plate-shaped PCM coupling part 126, a plate-shaped battery cell coupling part 124, and a positive temperature coefficient (PTC) element 125 disposed between the plate-shaped PCM coupling part 126 and the plate-shaped battery cell coupling part 124. The battery cell coupling part 124 protrudes from the outer end of the PCM assembly 120. Also, the connection member (B) 128 is coupled to the bottom of the PCM assembly 120 by an SMT such that the connection member (B) 128 completely closes the through-hole 122 for welding (See FIG. 1).

Consequently, the connection member (A) 123 is coupled to the top 114 of the battery cell 110, which serves as the cathode terminal, by welding, and the connection member (B) 128 is connected to the protruding anode terminal 112 of the battery cell 110, whereby the electrical connection between the battery cell 110 and the PCM assembly 120 is achieved.

The connection members 123 and 128 are connected to the electrode terminals of the battery cell 110, respectively, while not being bent as shown in FIG. 2. Consequently, it is possible to use connection members having a size smaller than that of the conventional connection members. Furthermore, it is not necessary to bend the connection members during the assembly process, and therefore, a dead space for bending is not required.

Figure 3:
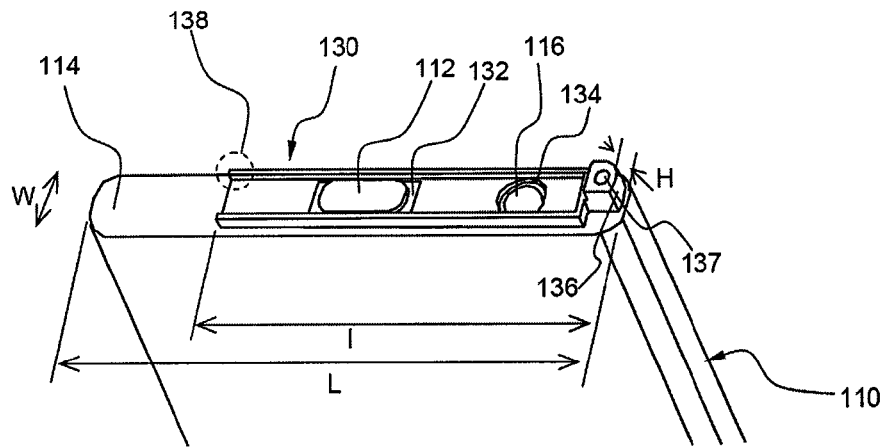
FIGS. 3 to 5 are partial typical views illustrating a series of processes for assembling the secondary battery pack of FIG. 1 step by step.
Figure 4:
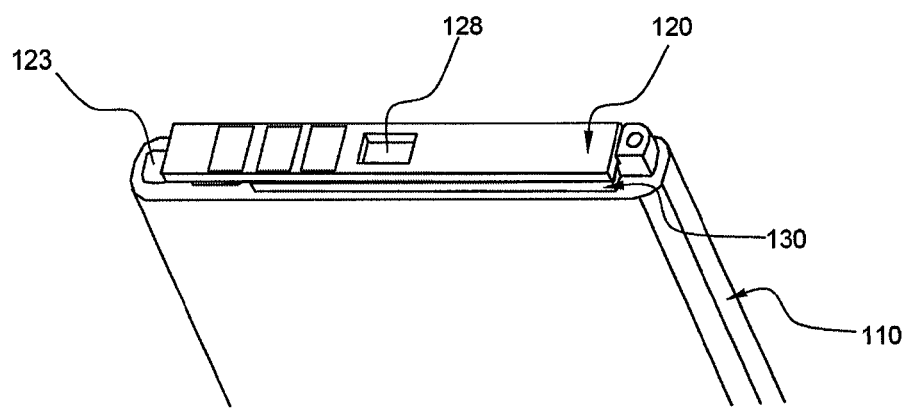
Figure 5:
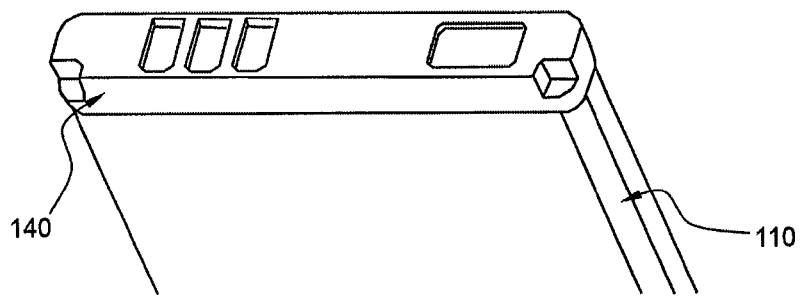

FIGS. 3 to 5 are partial typical views illustrating a series of processes for assembling the secondary battery pack of FIG. 1 step by step.

FIG. 3 illustrates a structure in which the insulative mounting member 130 is mounted to the top 114 of the battery cell 110. As shown in FIG. 3, the insulative mounting member 130 is attached to the top 114 of the battery cell 110 by an adhesive. The anode terminal 112 of the battery cell 110 is exposed upward through the first opening 132 of the insulative mounting member 130. The sealed electrolyte injection port 116 of the battery cell 110 is inserted through the second opening 134 of the insulative mounting member 130 such that the sealed electrolyte injection port 116 is exposed upward from the insulative mounting member 130.

Receiving sidewalls 138 protrude upward by a predetermined height from opposite ends of the insulative mounting member 130 in the widthwise direction W of the insulative mounting member 130 such that the PCM assembly 120 of FIG. 4 is stably mounted to the insulative mounting member 130 by the receiving sidewalls 138.

The insulative mounting member 130 has a length l less than the length L of the top 114 of the battery cell 110. A portion L−1 of the top 114 of the battery cell 110 exposed by this structure is used as the cathode terminal for connection with the connection member 124 (See FIG. 1).

Also, a protrusion 136 is formed at one end of the insulative mounting member 130 in the longitudinal direction of the insulative mounting member 130 such that the protrusion 136 extends upward by a predetermined height H. In the middle of the protrusion 136 is formed a coupling groove 137. The insulative top cap 140 (See FIG. 1) has a coupling member corresponding to the coupling groove 137. Consequently, it is possible to achieve the in-position coupling between the insulative mounting member 130 and the insulative top cap 140 and to increase the coupling strength between the insulative mounting member 130 and the insulative top cap 140.

FIG. 4 illustrates a structure in which the PCM assembly 120 is coupled to the structure of FIG. 3. Referring to FIG. 4, the battery cell coupling part 124 (See FIG. 2) of the connection member (A) 123 is located at the top 114 (See FIG. 3) of the battery cell 110, the connection member (B) 128 is located at the anode terminal 112 (See FIG. 3) of the battery cell 110, and the battery cell coupling part 124 of the connection member (A) 123 and the connection member (B) 128 are coupled to the top 114 of the battery cell 110 by welding. As a result, the electrical connection and the mechanical coupling between the connection members 123 and 128 and the battery cell 110 are achieved.

FIG. 5 is a typical view illustrating a structure in which the insulative top cap 140 is coupled to the structure of FIG. 4. Referring to FIG. 5, the coupling member 141 (See FIG. 7) is formed at the insulative top cap 140. The coupling member 141 is located at a position corresponding to the coupling groove 137 (See FIG. 3) of the insulative mounting member 130 (See FIG. 3). Consequently, the coupling member 141 of the insulative top cap 140 is inserted into the coupling groove 137 (See FIG. 3) of the insulative mounting member 130 (See FIG. 3), thereby achieving the mechanical coupling between the insulative mounting member 130 and the insulative top cap 140.

Figure 6:
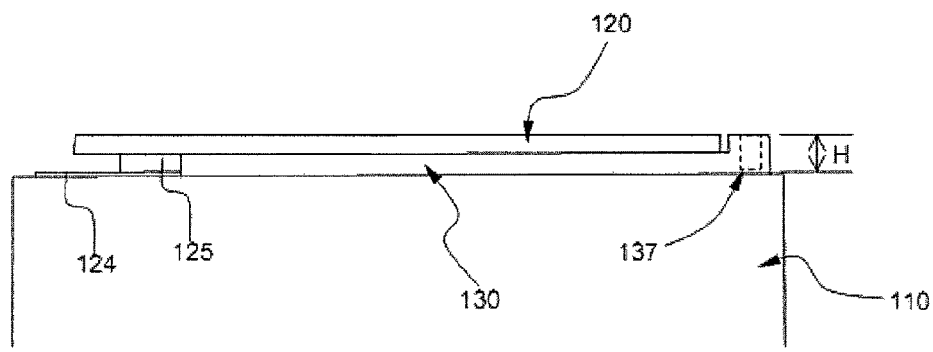
FIG. 6 is a typical front view of FIG. 4.

FIG. 6 is a typical front view of FIG. 4. Referring to FIG. 6, the insulative mounting member 130 has a height H approximately 1.8 mm less than that of a conventional secondary battery pack (not shown). Consequently, it is possible to increase the capacity of the battery cell 110 by as much as the volume corresponding to the reduced height.

Figure 7:
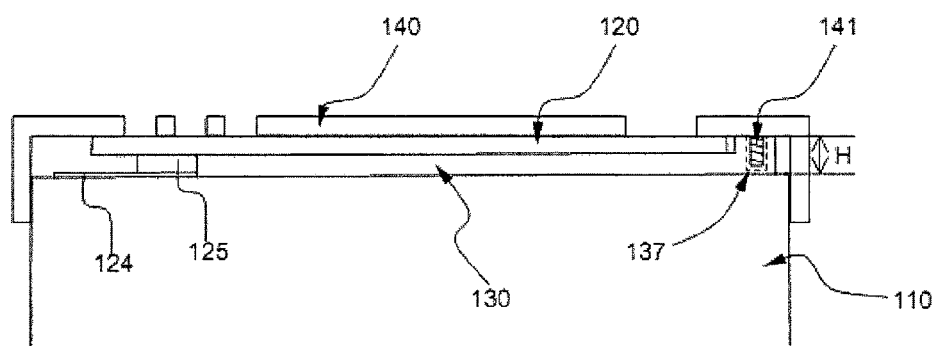
FIG. 7 is a vertical cross-section of FIG. 5.

FIG. 7 is a vertical cross section of FIG. 5. Referring to FIG. 7, the insulative cap 140 extends downward by a predetermined length such that a portion of the insulative cap 140 covers the outside surface of the upper end of the battery cell 110 in a state in which the insulative cap 140 is coupled to the upper end of the battery cell 110. The insulative cap 140 extends downward and is joined to the outer surface of the upper end of the battery cell 110 by bonding. However, it should be noted that the scope of the present invention is not limited by the illustrated embodiments.

INDUSTRIAL APPLICABILITY

As apparent from the above description, the secondary battery pack according to the present invention is constructed in a structure in which the connection members are coupled to the bottom of the PCM in predetermined forms, and the insulative mounting member is configured to allow the connection members to be exposed upward from the top of the PCM. Consequently, the present invention has the effect of reducing the number of the parts constituting the battery pack, the number of the process steps, and manufacturing the battery pack in a more compact structure. Also, it is possible to reduce the size of the upper space of the battery pack where the PCM assembly is mounted through the provision of this structure. Consequently, the present invention has the effect of increasing the capacity of the battery pack as compared with other battery packs having the same standard.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery pack comprising:
a battery cell having an electrode assembly of a cathode/separator/anode structure mounted in a battery case together with an electrolyte in a sealed state;
a protection circuit module (PCM) assembly having a size less than the top of the battery cell in the longitudinal direction of the battery cell and including a PCM and first and second connection members coupled to a bottom of the PCM, the PCM assembly being provided with a through-hole for connection;
an insulative mounting member constructed in a structure in which the PCM assembly is loaded on the top of the insulative mounting member, the insulative mounting member being mounted at the top of the battery cell, the insulative mounting member having openings through which first and second electrode terminals of the battery cells are exposed; and
an insulative cap coupled to an upper end of the battery cell for covering the insulative mounting member in a state in which the PCM assembly is loaded on the insulative mounting member, wherein
the first connection member is electrically connected to the first electrode terminal of the battery cell and protrudes from one end of the PCM assembly such that a region of the first connection member electrically connected to the first electrode terminal of the battery cell is exposed upward from the PCM assembly,
the first connection member includes a PCM coupling part coupled to the bottom of the PCM, a battery cell coupling part coupled to the top of the battery cell, and a positive temperature coefficient (PTC) element disposed between the PCM coupling part and the battery cell coupling part,
the second connection member is electrically connected to the second electrode terminal of the battery cell and is coupled to the bottom of the PCM such that at least a portion of the second connection member is exposed upward from the PCM assembly through the through-hole for connection,
the insulative mounting member has a size less than the top of the battery cell in the longitudinal direction of the battery cell such that the insulative mounting member is provided with a region where the first connection member is connected to the battery cell,
one end of the PCM assembly in which the first connection member is connected protrudes from one end of the insulative mounting member in the longitudinal direction such that the battery cell coupling part and the PTC element of the first connection member are disposed at the region where the first connection member is connected to the battery cell,
the electrical connection between the first and second connection members and the electrode terminals of the battery cell is achieved at a top of the PCM while the insulative mounting member and the PCM assembly are loaded on the battery cell, and
the insulative cap extends downward by a predetermined length such that at least a portion of the insulative cap covers the outside surface of the upper end of the battery cell in a state in which the insulative cap is coupled to the upper end of the battery cell.

2. The secondary battery pack according to claim 1, wherein the battery case is a metal container.

3. The secondary battery pack according to claim 1, wherein the first and second connection members are coupled to the bottom of the PCM by a surface mount technology (SMT).

4. The secondary battery pack according to claim 1, wherein the first electrode terminal is a cathode terminal, and the second electrode terminal is an anode terminal.

5. The secondary battery pack according to claim 1, wherein the PCM coupling part and the battery cell coupling part are formed of a metal plate.

6. The secondary battery pack according to claim 1, wherein the second connection member is formed of a nickel plate.

7. The secondary battery pack according to claim 1, wherein the insulative mounting member is provided with a first opening through which the second electrode terminal of the battery cell is exposed upward and a second opening foiled at a position spaced a predetermined distance from the first opening such that a sealed electrolyte injection port of the battery cell is exposed upward through the second opening.

8. The secondary battery pack according to claim 1, wherein the insulative mounting member is provided at one end thereof in the longitudinal direction with a protrusion extending upward by a predetermined height, the protrusion has a coupling groove formed in a middle part thereof, and the insulative cap has a protruding coupling member corresponding to the coupling groove, thereby increasing a coupling strength between the insulative mounting member and the insulative cap.

9. The secondary battery pack according to claim 1, wherein the insulative mounting member is provided at opposite ends thereof in the lateral direction with receiving sidewalls protruding upward such that the PCM assembly is stably mounted to the insulative mounting member by the receiving sidewalls.

10. The secondary battery pack according to claim 1, wherein the coupling between the top of the battery case and the insulative mounting member is achieved by bonding.

11. The secondary battery pack according to claim 1, wherein the insulative cap extends downward and is joined to the outer surface of the upper end of the battery cell by bonding or by mechanical coupling.

12. The secondary battery pack according to claim 1, further comprising a bottom cap coupled to a lower end of the battery cell.

13. The secondary battery pack according to claim 12, further comprising a sheathing film attached to an outer surface of the battery case of the battery cell.

14. The secondary battery pack according to claim 13, wherein the sheathing film is attached to the outer surface of the battery case such that the sheathing film covers a lower extension of the insulative cap.

15. The secondary battery pack according to claim 1, wherein the battery cell is a prismatic lithium secondary battery cell.

16. The secondary battery pack according to claim 1, wherein the first and second connection members are coupled to the bottom of the PCM by a surface mount technology (SMT), the PCM assembly being provided at a middle part thereof with the through-hole for welding.

17. The secondary battery pack according to claim 16, wherein the second connection member is coupled to the bottom of the PCM assembly such that the second connection member completely closes the through-hole for welding.

* * * * *